United States Patent [19]
Perrin et al.

[11] 4,453,513
[45] Jun. 12, 1984

[54] INTERNAL COMBUSTION ENGINE

[75] Inventors: Günter Perrin, Stuttgart; Horst Bergmann, Esslingen, both of Fed. Rep. of Germany

[73] Assignee: Daimler-Benz Aktiengesellschaft, Stuttgart, Fed. Rep. of Germany

[21] Appl. No.: 380,408

[22] Filed: May 20, 1982

[30] Foreign Application Priority Data

May 22, 1981 [DE] Fed. Rep. of Germany ....... 3120377

[51] Int. Cl.³ .............................................. F02F 3/26
[52] U.S. Cl. .................................... 123/279; 123/259; 123/260; 123/283; 123/661
[58] Field of Search ............ 123/193 CP, 193 P, 260, 123/263, 275, 276, 279, 283, 305, 661, 259

[56] References Cited

U.S. PATENT DOCUMENTS

| | | | |
|---|---|---|---|
| 2,749,899 | 6/1956 | Mitchell | 123/279 X |
| 2,749,900 | 6/1956 | Mitchell | 123/279 X |
| 2,749,901 | 6/1956 | Mitchell | 123/663 |
| 2,826,186 | 3/1958 | Fisher | 123/661 X |
| 3,094,974 | 6/1963 | Barber | 123/276 X |
| 3,498,276 | 3/1970 | Hardenberg | 123/276 X |
| 4,048,974 | 9/1977 | Seifert et al. | 123/279 |

*Primary Examiner*—Parshotam S. Lall
*Assistant Examiner*—W. R. Wolfe
*Attorney, Agent, or Firm*—Craig & Burns

[57] ABSTRACT

An externally auto-ignited four-stroke internal combustion engine which includes a combustion chamber disposed in an upper surface of a piston such that, in an upper dead-center position of the piston, the combustion chamber receives almost all of the fuel-air mixture. The combustion chamber includes a planar bottom portion and has a cross-sectional shape of a truncated cone expanding in a direction of the cylinder head. The internal combustion engine also includes a recess or depression provided in the cylinder head and disposed eccentrically with respect to a longitudinal center axis of the cylinder. The depression or recess in the cylinder head has the shape of a truncated cone expanding in a direction of the piston, with a spark plug projecting or penetrating into the recess or depression in the cylinder head. In order to enable the achievement of good combustion, increased overall engine performance, and the minimum amount of harmful components in the exhaust gases from the engine when different types of fuel are used, predetermined constructional parameters are selected with respect to the combustion chamber and recess or depression disposed above the combustion chamber as well as the disposition of the combustion chamber with respect to a longitudinal center axis of the cylinder.

17 Claims, 4 Drawing Figures

INTERNAL COMBUSTION ENGINE

The present invention relates to an internal combustion engine and, more particularly, to an externally auto-ignited four-stroke internal combustion engine having a combustion chamber disposed in a piston, with the combustion chamber in an upper dead center position of the piston receiving almost all of the fuel-air mixture, and with the combustion chamber means having a planar bottom surface and a cross-sectional shape of a truncated cone opening in a direction of the cylinder head, as well as a recess or depression disposed in the cylinder head eccentrically with respect to a longitudinal center axis of the cylinder at a position above the combustion chamber, which depression has the shape of a truncated cone expanding in a direction of the piston and accommodates a projecting spark plug.

In German Auslegeschrift No. 25 12 218, an externally auto-ignited four-stroke internal combustion engine of the aforementioned type is proposed wherein a largest diameter of the combustion chamber is about 55 to 70% of the piston diameter and a depth of the combustion chamber measures approximately 15 to 20% of the piston diameter. In this proposed construction, the surfaces of the truncated cone-shaped combustion chamber are disposed at about a 10 to 30% inclination with respect to a longitudinal center axis of the cylinder. A recess or depression provided in the cylinder head has a largest diameter approximately equal to twice a diameter of the spark plug thread and a depth of about 20 to 25% of its diameter. Additionally, a wedge-shaped cylinder head recess having point ends extending flatly in a direction of the longitudinal center axis of the cylinder connects with the recess and functions as an ignition channel.

A disadvantage of the above-proposed construction resides in the fact that, in spite of the relatively expensive design or construction of the combustion chamber, it has been found that, especially when different types of fuel are used, good combustion is not always ensured. As can be readily appreciated, poor combustion adversely affects the overall performance of the internal combustion engine and also increases the amount of harmful pollutants in exhaust gases of the engine.

The aim underlying the present invention essentially resides in providing an internal combustion engine of the aforementioned type wherein, solely by influencing individual construction parameters, good combustion is ensured even with different types of fuels so as to result in a lower fuel consumption, high overall engine performance, and the emission of exhaust gases which are extensively free of harmful components.

In accordance with advantageous features of the present invention, the combustion chamber has a depth which equals about 25% to 35% of a diameter of a piston of the engine, with a surface of the truncated cone-shaped depression provided in the cylinder head being disposed vertically with respect to a longitudinally extending center axis of a spark plug in an area of the spark plug. The spark plug has a length of 9% to 14% of the piston diameter and is arranged by a distance of 3% to 5.5% of the piston diameter away from a point at which the spark plug penetrates the cylinder head, that is, a point of intersection of the longitudinal center axis of the spark plug with a plane extending through a lower surface of a cylinder head of the engine. The longitudinal center axis of the spark plug extends at an inclination of an angle of 45° to 65° with respect to the plane extending through the lower surface of the cylinder head, and the truncated cone-shaped depression has a cone angle of 100° to 110°

Advantageously, the depth of the combustion chamber is about 30% of the piston diameter and a surface of the truncated cone-shaped combustion chamber is inclined by about 10% with respect to a longitudinal center axis of the cylinder.

Preferably, the truncated cone-shaped depression in the cylinder head has a cone angle of 100° and a front side of the thread housing of the spark plug that faces the combustion chamber is disposed to be in alignment with the surface of the truncated cone-shaped depression. A further depression is disposed in the cylinder head, with the depression preferably having a round base and extending, beginning from a surface of the truncated cone-shaped depression, approximately symmetrically to the longitudinal center axis of the cylinder at a position above the combustion chamber. Advantageously, the depression or recess has a depth of 2 mm to 4 mm, with the preferable depth being about 2.5 mm.

In accordance with further features of the present invention, a surface of the combustion chamber is formed having a radius of 0.8% to 2.4% of the piston diameter, with the surface being connected to a piston crown surface. Preferably, the radius is approximately 1.6% of the piston diameter.

A surface forming a portion of the truncated cone-shaped depression or recess formed in the cylinder head and delimiting an end wall through which the spark plug extends, advantageously, in accordance with the present invention, has a length of about 11.5% of the piston diameter and is disposed away from the point of penetration of the spark plug by a distance or length of about approximately 4.5% of the piston diameter.

Preferably, the longitudinal center axis of the spark plug is inclined by an angle of approximately 56° with respect to the plane extending through the lower surface of the cylinder head.

Advantageously, in accordance with further features of the present invention, the surface of the combustion chamber is connected with a bottom of the combustion chamber by forming a radius of between 4% to 8% of the piston diameter, with the radius being preferably about 6%.

The combustion chamber is, advantageously, disposed symmetrically with respect to the longitudinal center axis of the cylinder or, alternatively, the combustion chamber may also be disposed eccentrically with respect to the longitudinal center axis of the cylinder.

Advantageously, the eccentricity of a center of the piston with respect to a center of the combustion chamber, as viewed in an X-direction is equal to about 60 to 100% and, in a Y-direction, is equal to about 80% to 100%, wherein X and Y are eccentricity measurements of the eccentricity existing between the piston center and point of penetration of the spark plug in the cylinder head.

Accordingly, it is an object of the present invention to provide an externally auto-ignited four-stroke internal combustion engine which avoids, by simple means, shortcomings and disadvantages encountered in the prior art.

Another object of the present invention resides in providing an externally auto-ignited four-stroke internal combustion engine which improves the overall performance of the internal combustion engine by ensuring the existence of proper combustion conditions and by reducing the amount of harmful pollutants contained in exhaust gases from the engine.

Another object of the present invention resides in providing an externally auto-ignited four-stroke internal combustion engine which has a compact combustion chamber and a short ignition travel path so as to permit high compression, thereby positively influencing both fuel consumption and engine performance.

A still further object of the present invention resides in providing an externally auto-ignited four-stroke internal combustion engine which enables the use of an almost non-twisting or non-curved inlet system thereby achieving an optimum filling of the respective cylinders of the engine.

Another object of the present invention resides in providing an externally auto-ignited four-stroke internal combustion engine which permits the utilization of a fuel-air mixture having a high excess of air, thereby resulting in the minimizing of the emission of harmful components in the exhaust gases of the engine.

Yet another object of the present invention resides in providing an externally auto-ignited four-stroke internal combustion engine which functions reliably under all operating load conditions of the engine.

These and other objects, features, and advantages of the present invention will become more apparent from the following description when taken in connection with the accompanying drawing which shows, for the purposes of illustration only, two embodiments in accordance with the present invention, and wherein.

Figure 3:
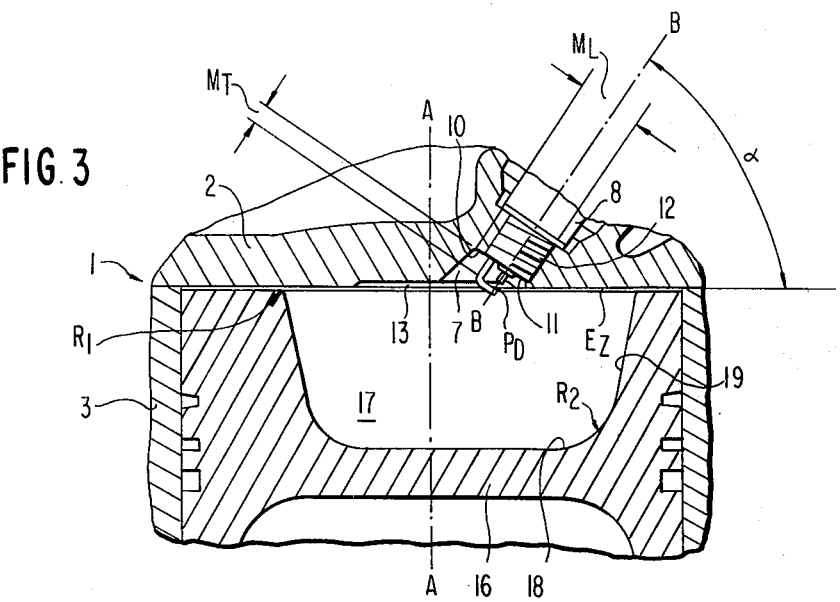
Figure 4:
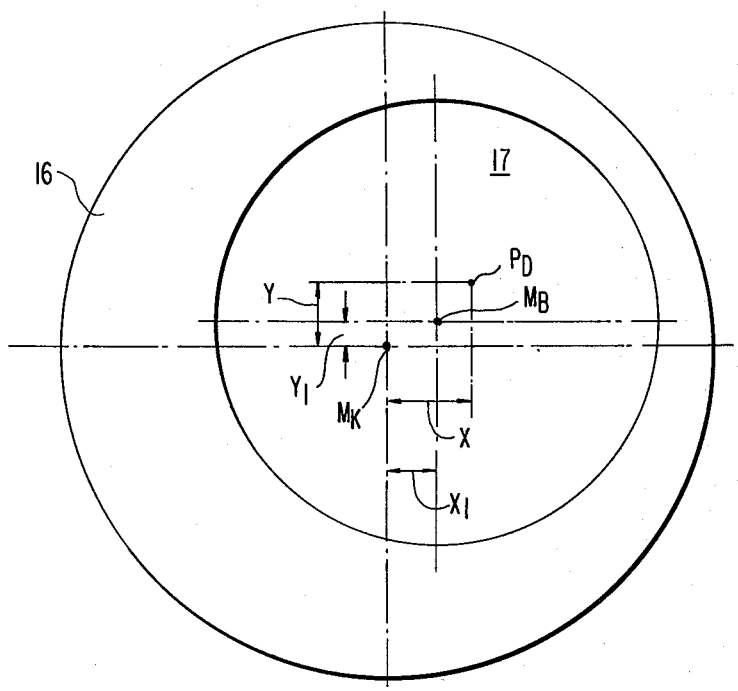

FIG. 3 is a partial cross-sectional view of another embodiment of an internal combustion engine constructed in accordance with the present invention, in an area of the combustion chamber disposed eccentrically with respect to the longitudinal center axis of the cylinder; and FIG. 4 is a schematic top view of a piston of the internal combustion engine illustrating a point of penetration of the spark plug in the cylinder head.

Figure 1:
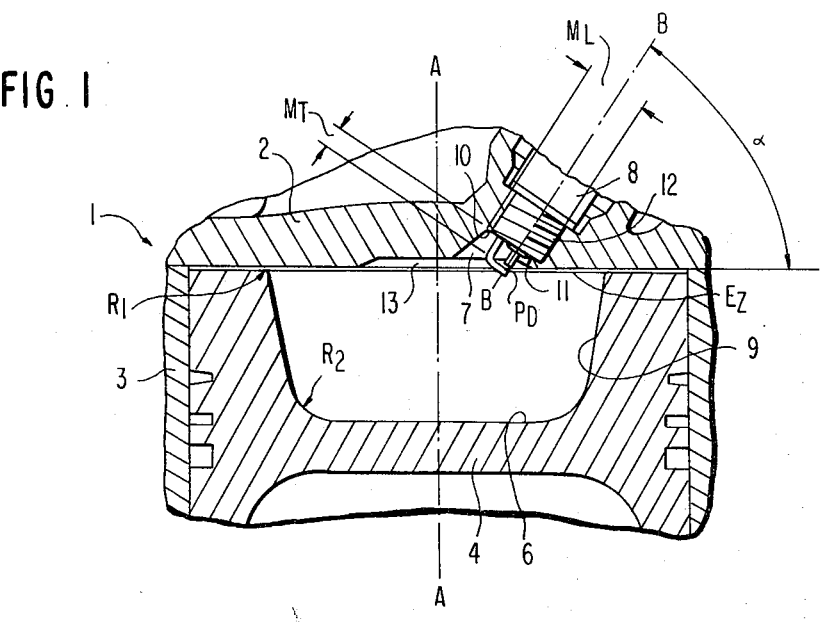
FIG. 1 is a partial cross-sectional view of an internal combustion engine constructed in accordance with the present invention in an area of a combustion chamber disposed symmetrically with respect to a longitudinal center axis of a cylinder of the engine.
Figure 2:
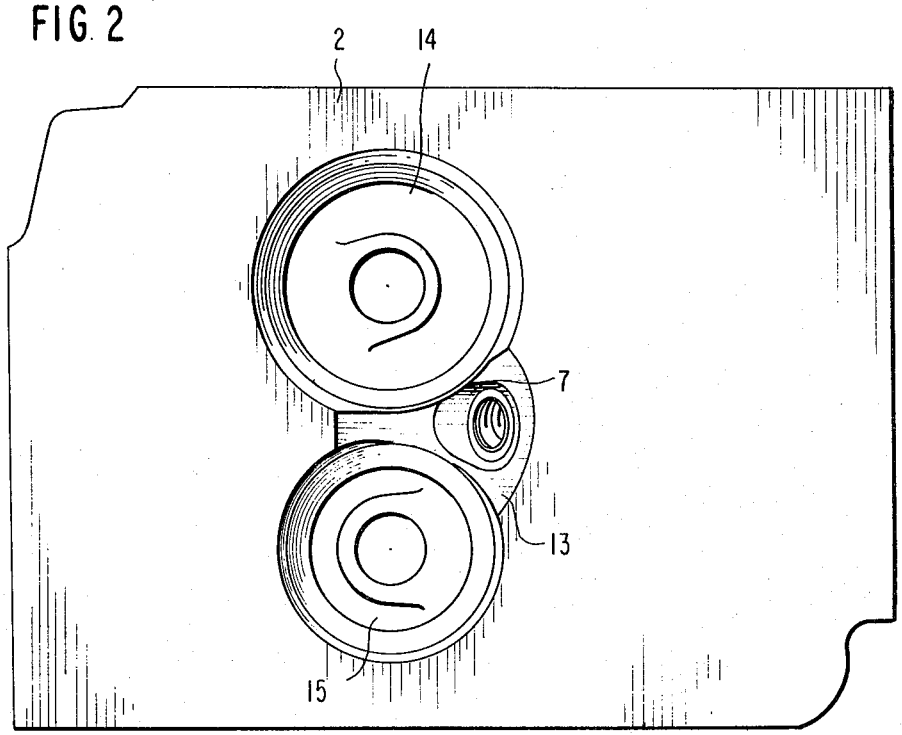
FIG. 2 is a bottom of the cylinder head of FIG. 1 with a spark plug removed.

Referring now to the drawings wherein like reference numerals are used in the various views to designate like parts and, more particularly, to FIGS. 1 and 2, according to these figures, an internal combustion engine generally designated by the reference numeral 1 includes a cylinder head 2 arranged on a cylinder block of the engine 1 with the block being provided with, for example, a cylinder liner 3 in which the piston 4 is guided for reciprocating movement. The piston 4 includes a combustion chamber 5 in an upper surface thereof, with the combustion chamber 5 being disposed symmetrically with respect to a longitudinal center axis A—A of the cylinder. The combustion chamber is arranged such that, in an upper dead-center position of the piston 4, approximately the whole fuel-air mixture is directed into the combustion chamber 5. The combustion chamber 5 includes a flat bottom wall or portion 6 and has a cross-sectional shape of a truncated cone which expands in the direction of the cylinder head 2.

A recess or depression 7, disposed eccentrically with respect to the longitudinal center axis A—A of the cylinder, is disposed in the cylinder head 2 at a position above the combustion chamber 5. The recess or depression 7 has a cross-sectional shape of a truncated cone expanding in a direction of the piston 4. A spark plug 8 is provided which projects into the recess or depression 7.

The combustion chamber 5 has a depth of about 25% to 35% of a diameter of the piston 4, with a surface 9 of the truncated cone-shaped combustion chamber 5 being inclined, with respect to the longitudinal center axis A—A by 5° to 15°. A surface 10 of the truncated cone-shaped depression or recess 7 provided in the cylinder head 2 in an area of the spark plug 8 is disposed substantially at a right angle with respect to a longitudinal center axis B—B of the spark plug 8. The spark plug 8 has a length $M_L$ of 9% to 14% of the diameter of the piston 4 and is disposed at a distance $M_T$ of 3% to 5.5% of the diameter of the piston 4 at a position away from a point $P_D$ at which the spark plug 8 penetrates the surface 10 of the truncated cone-shaped recess or depression 7, i.e., a point of intersection of the longitudinal center axis B—B of the spark plug 8 with a plane $E_Z$ extending through a lower surface of the cylinder head 2.

The longitudinal center axis B—B of the spark plug 8 is inclined at an angle $\alpha$ with respect to the plane $E_Z$ of the cylinder head 2 with the angle $\alpha$ being in the range of 45% to 65%. The truncated cone-shaped recess or depression has a cone angle of between 100° to 110°.

Advantageously, in accordance with the present invention, the combustion chamber 5 has a depth of approximately 30% of a diameter of the piston 4, with the surface 9 of the truncated cone-shaped combustion chamber 5 being inclined by approximately 10% with respect to the longitudinal center axis A—A of the cylinder. The cone-shaped recess or depression 7 in the cylinder head 2 preferably has a cone angle of 100°, with the surface 10 having a length of approximately 11.5% of a diameter of the piston 4. The surface 10 is displaced or spaced from the penetration point $P_D$ of the spark plug 8 by a distance of $M_T$, which is equal to about 4.5% of the piston diameter, and the longitudinal axis B—B of the spark plug 8 preferably is inclined at an angle $\alpha$ of approximately 56° with respect to the plane $E_Z$ of the cylinder head 2.

A front or terminal side 11 of the threaded portion or housing 12 of the spark plug 8 is disposed so as to face the combustion chamber in a manner to be in alignment with the surface 10 of the truncated cone-shaped recess or depression 7.

A further recess or depression generally designated by reference numeral 13 is disposed in the cylinder head 2, and, preferably, the further recess or depression 13 has a round base and extends, beginning from the surface of the depression or recess 7, approximately symmetrically with respect to the longitudinal center axis A—A of the cylinder at a position above the combustion chamber 5. The recess or depression 13 advantageously has a depth of 2–4 mm and, preferably, a depth of 2.5 mm. The surface 9 of the combustion chamber 5 is connected with the piston crown by a radius generally designated by the reference character $R_1$, with the radius $R_1$ being equal to approximately 0.8 to 2.4% of the diameter of the piston 4. Preferably, the radius $R_1$ is about 1.6% of the diameter of the piston 4. The surface 9 of the combustion chamber 5 is connected with the bottom portion or bottom wall 6 of the combustion chamber 5 by a portion having a radius $R_2$ which is equal to about 4 to 8% of a diameter of the piston 4 and, preferably, the radius $R_2$ is approximately 6% of a diameter of the piston 4. The cylinder head 2 includes an inlet valve 14 and an outlet valve 15, with an inlet channel (not shown) extending to the inlet valve 14 and, advantageously, being constructed so as to be relatively straight or nontwisting.

During an operation of the internal combustion engine 1, the fuel-air mixture flows through an open inlet valve 14 into the cylinder. During a compression cycle, an edge area of the piston 4 disposed outside of the combustion chamber 5, together with the bottom surface of the cylinder head 2, forms a compression gap that forces the fuel-air mixture along a motion component pointing in a direction of the longitudinal axis A—A of the cylinder. The above-noted constructional features of the present invention result in the formation of a combustion chamber that now ensures a safe ignition of the fuel-air mixture as well as a short ignition path so that when different types of fuel are employed, good combustion is nevertheless guaranteed, resulting in low fuel consumption, higher overall engine performance, and the emission of exhaust gases which are low in harmful components.

The internal combustion engine of FIGS. 3 and 4 differs from the embodiment of FIGS. 1 and 2 in that a piston 16 includes a combustion chamber 17 which is disposed eccentrically with respect to the longitudinal center axis A—A of the cylinder. The combustion chamber 17 includes a bottom surface or wall portion as well as a surface 19. A penetration point $P_D$ to a center of the piston $M_K$ is best described by means of a Cartesian coordinate system. As shown in FIG. 4, the center of the combustion chamber $M_B$ with respect to a center of the piston $M_K$ has the coordinates $X_1$ and $Y_1$, wherein $X_1$ is equal to 60% to 100% $\times$ X and $Y_1$ is equal to 80% to 100% $\times$ Y.

While we have shown and described only two embodiments in accordance with the present invention, it is understood that the same is not limited thereto but is susceptible of numerous changes and modifications as known to one having ordinary skill in the art, and we therefore do not wish to be limited to the details shown and described herein, but intend to cover all such changes and modifications as are encompassed by the scope of the appended claims.

We claim:

1. An externally auto-ignited four-stroke internal combustion engine comprising at least one cylinder means having a piston means reciprocatingly mounted therein, a cylinder head means, a combustion chamber means arranged in a top portion of the piston means for receiving substantially all of a fuel-air mixture when the piston means is in an upper dead-center position, the combustion chamber means having a planar bottom surface and a cross-sectional shape of a truncated cone opening in a direction of the cylinder head means, a recess means arranged in the cylinder head means eccentrically with respect to a longitudinal center axis of the cylinder means at a position above the combustion chamber means, the recess means having a cross-sectional shape of a truncated cone opening in a direction of the piston means, spark plug means arranged in the cylinder head means and projecting into the recess means, the combustion chamber means having a depth of about 25-35% of the diameter of the piston means, an upper surface of the recess means extending substantially at a right angle to a longitudinal center axis of the spark plug means, the upper surface has a length of about 9-14% of the diameter of the piston means and is disposed at a distance of 3-5.5% of the piston diameter from a point of intersection of the longitudinal center axis of the spark plug means with a plane extending approximately through a lower surface of the cylinder head means, the spark plug means being arranged in the cylinder head means in such a manner that the longitudinal center axis of the spark plug means subtends, with the plane extending approximately through the lower surface of the cylinder head means, an angle of between 45°-65°, and the recess means in the cylinder head means having a cone angle of between approximately 100°-110°.

2. An internal combustion engine according to claim 1, wherein the recess means in the cylinder head means has a cone angle of 100°.

3. An internal combustion engine according to claim 1, wherein the spark plug means includes a threaded portion, and wherein an end face of the threaded portion facing the combustion chamber means is disposed in alignment with the upper surface of the recess means.

4. An internal combustion engine according to claim 1, characterized in that the upper surface of the recess means has a length of about 11.5% of the diameter of the piston means and is spaced from the point of intersection of the longitudinal center axis of the spark plug means and the plane extending approximately through the lower surface of the cylinder head means by a distance or approximately 4.5% of the diameter of the piston means.

5. An internal combustion engine according to claim 1, wherein the longitudinal center axis of the spark plug means subtends an angle of approximately 56° with respect to the plane extending approximately through the lower surface of the cylinder head means.

6. An internal combustion engine according to claim 1, wherein a further recess means is disposed in the cylinder head means, said further recess means having an essentially round base and extending, beginning from the upper surface of the first-mentioned recess means approximately symmetrically to the longitudinal center axis of the cylinder means at a position above the combustion chamber means.

7. An internal combustion engine according to claim 6, wherein the further recess means has a depth of between approximately 2 mm-4 mm.

8. An internal combustion engine according to claim 7, wherein the depth of the further recess means is 2.5 mm.

9. An internal combustion engine according to claim 1, wherein lateral surfaces of the combustion chamber means are inclined approximately 10° with respect to the longitudinal center axis of the cylinder means.

10. An internal combustion engine according to one of claims 1 or 9, wherein a connecting portion between lateral surfaces of the combustion chamber means and crown surface of the piston means has a radius of about 0.8%-2.4% of the diameter of the piston means.

11. An internal combustion engine according to claim 10, characterized in that the radius is approximately 1.6% of the diameter of the piston means.

12. An internal combustion engine according to claim 1, wherein the combustion chamber means has a depth of about 30% of the diameter of the piston means.

13. An internal combustion engine according to one of claims 1, 2, or 9, wherein a connecting portion connecting the lateral surfaces of the combustion chamber means with the planar bottom surface thereof has a radius of about 4%–8% of the diameter of the piston means.

14. An internal combustion engine according to claim 13, wherein the radius is approximately 6% of the diameter of the piston means.

15. An internal combustion engine according to one of claims 1, 12, 9, 2, 3, 6, 4, or 5, wherein the combustion chamber means is disposed symmetrically with respect to the longitudinal center axis of the cylinder means.

16. An internal combustion engine according to one of claims 1, 12, 9, 2, 3, 6, 4, or 5, wherein the combustion chamber means is disposed eccentrically with respect to the longitudinal center axis of the cylinder means.

17. An internal combustion engine according to claim 16, wherein, in an X and Y coordinate system, the eccentricity of a center of the piston means with respect to a center of the combustion chamber means in an X direction is 60–100% $\times$ X and, in a Y direction, is 80–100% $\times$ Y, wherein X and Y represent measurements of eccentricity existing between the center of the piston means and the point of intersection of the longitudinal center axis of the spark plug means with the plane extending approximately through the lower surface of the cylinder head means.

* * * * *